United States Patent [19]
Sparkman

[11] Patent Number: 5,699,785
[45] Date of Patent: Dec. 23, 1997

[54] SOLAR ENERGY COLLECTOR

[76] Inventor: Scott Sparkman, P.O. Box 240471, Honolulu, Hi. 26824-0471

[21] Appl. No.: 721,359

[22] Filed: Sep. 26, 1996

[51] Int. Cl.$^6$ ........................................ F24J 2/46
[52] U.S. Cl. .................. 126/623; 126/579; 126/640; 126/701
[58] Field of Search ................... 126/623, 640, 126/642, 579, 621, 704, 701–702

[56] References Cited

U.S. PATENT DOCUMENTS

| | | | |
|---|---|---|---|
| 4,194,497 | 3/1980 | Gramer et al. | 126/623 |
| 4,279,240 | 7/1981 | Artusy | 126/579 |
| 4,355,629 | 10/1982 | Cornell, III | 126/640 |
| 4,365,615 | 12/1982 | Melvin | 126/640 |
| 4,391,269 | 7/1983 | Watson | 126/640 |
| 4,474,171 | 10/1984 | Caproon et al. | 126/640 |
| 4,483,324 | 11/1984 | Fromm | 126/640 |

Primary Examiner—James C. Yeung
Attorney, Agent, or Firm—Michael I. Kroll

[57] ABSTRACT

A solar energy collector (14) which comprises a heat absorbing structure (16) which takes in radiant energy and transfers the radiant energy to water carried therein. A main body (18) encompasses the heat absorbing structure (16). The radiant energy will enter a transparent top portion (19) of the main body (18) to reach the heat absorbing structure (16). Elements (20) are for carrying the water into and out of the heat absorbing structure (16). Components (22) are for supporting opposite ends of the heat absorbing structure (16) within the main body (18) on a roof (24) of a building (26). A facility (28) is for covering the transparent top portion (19) of the main body (18). Equipment (30) is for automatically opening the covering facility (28) during daylight hours to expose the transparent top portion (19), to allow the radiant energy to reach the heat absorbing structure (16) and for automatically closing the covering facility (28) during nighttime hours, to seal the transparent top portion (19) to keep the radiant energy within the heat absorbing structure (16) in the main body (18).

17 Claims, 4 Drawing Sheets

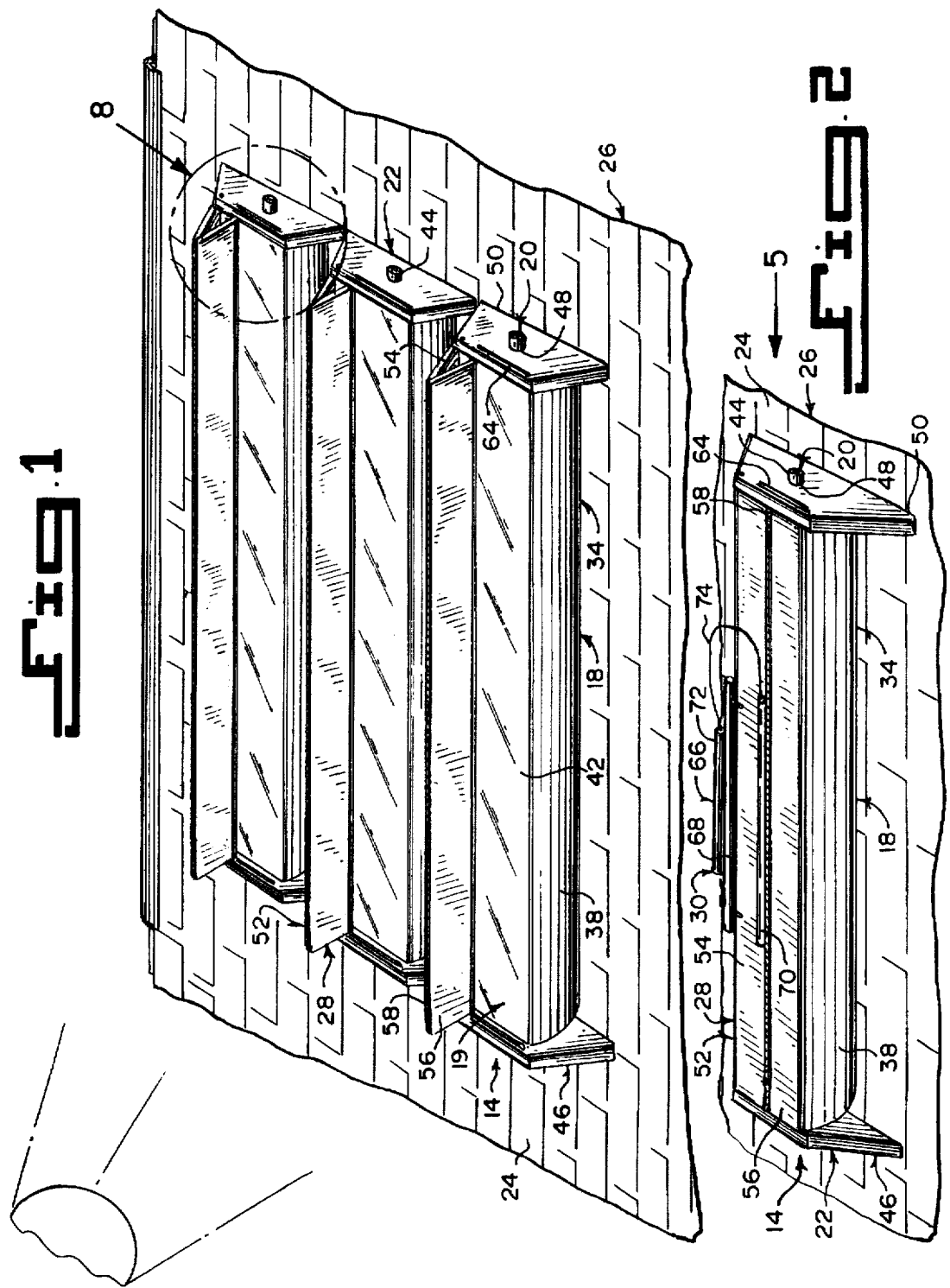

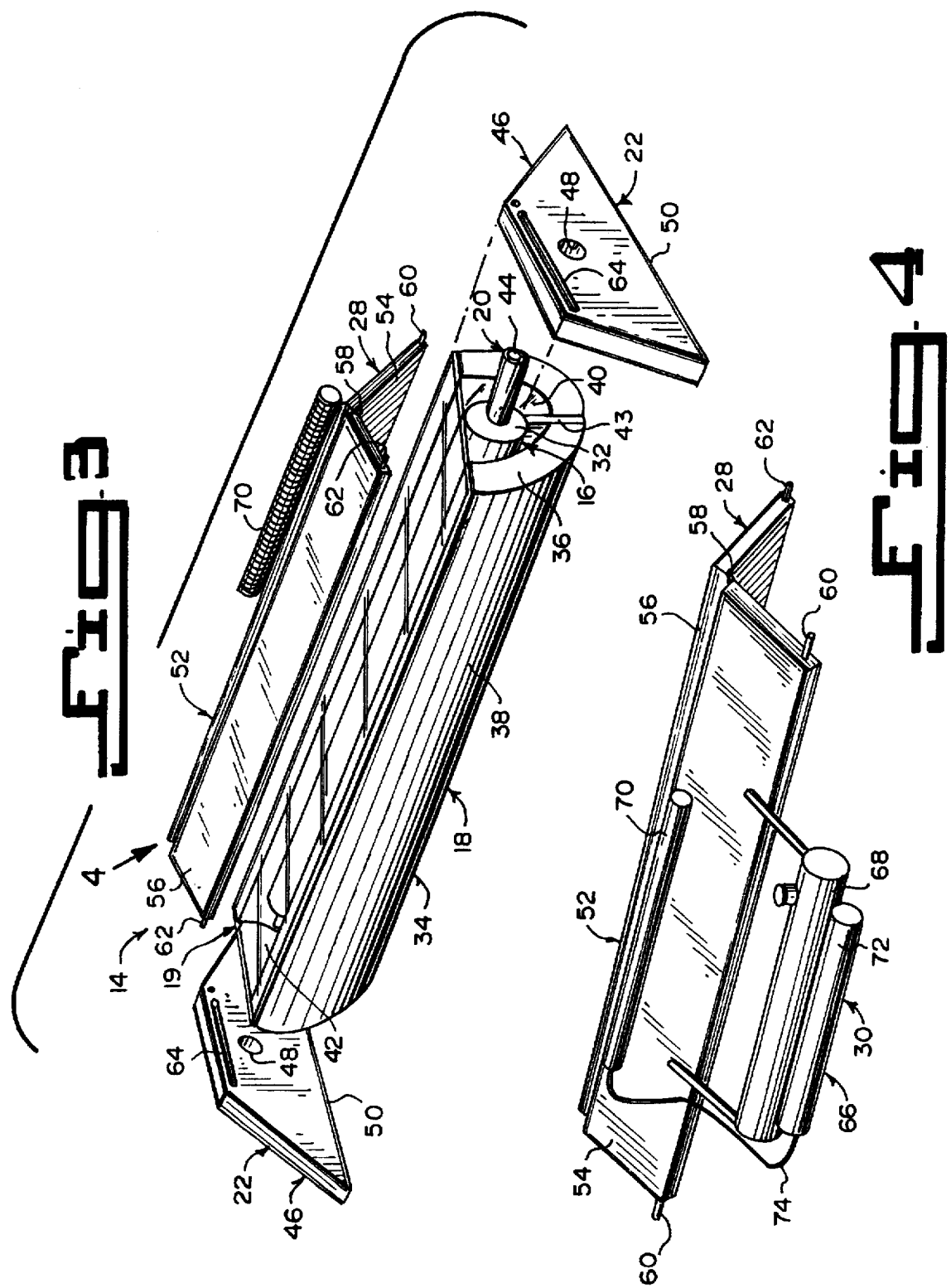

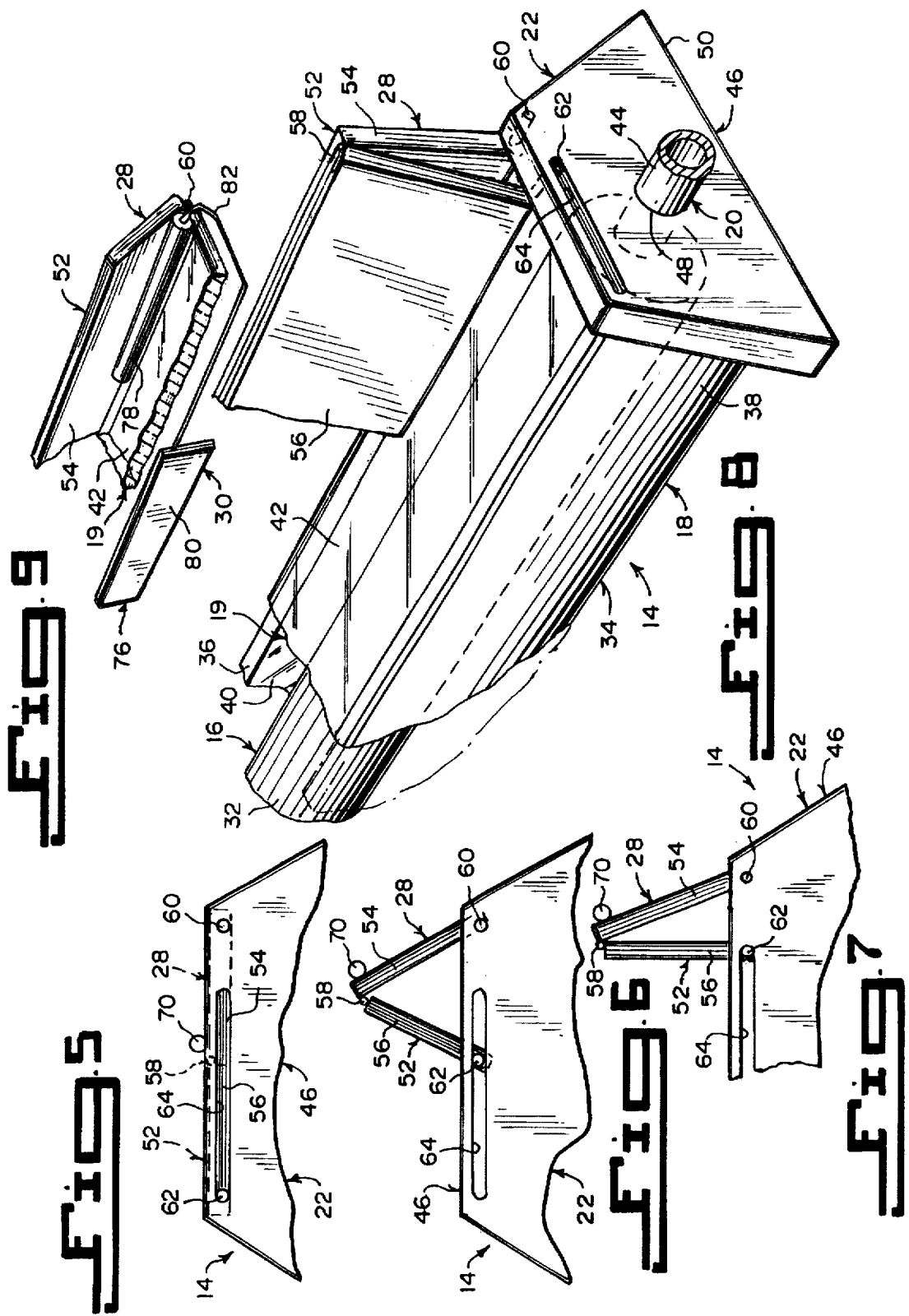

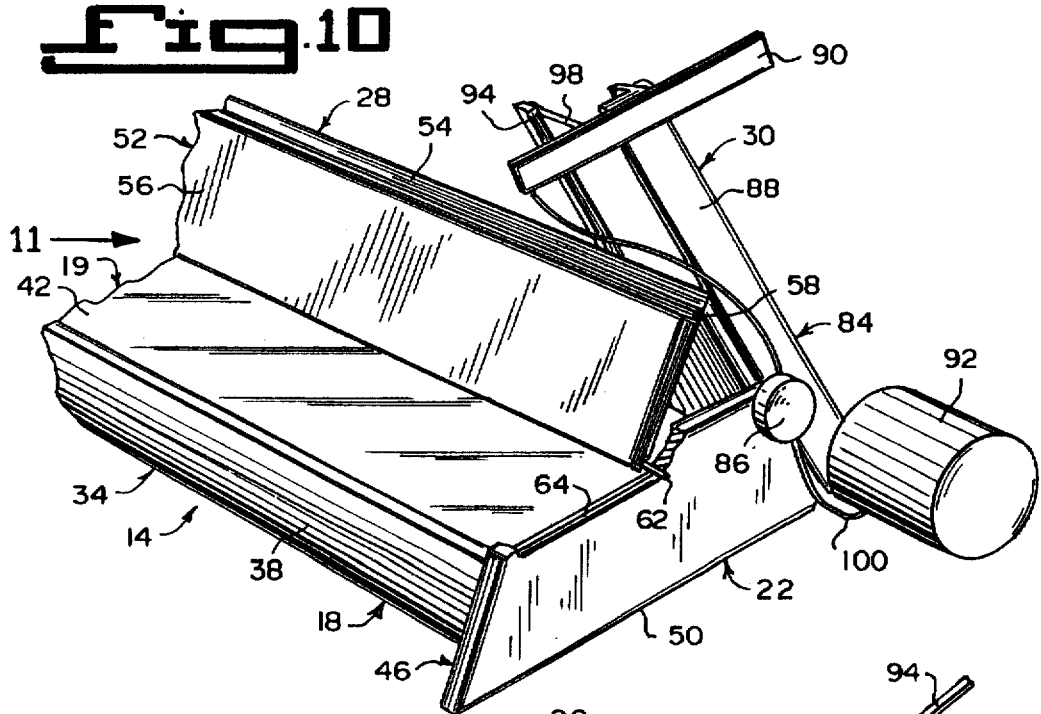
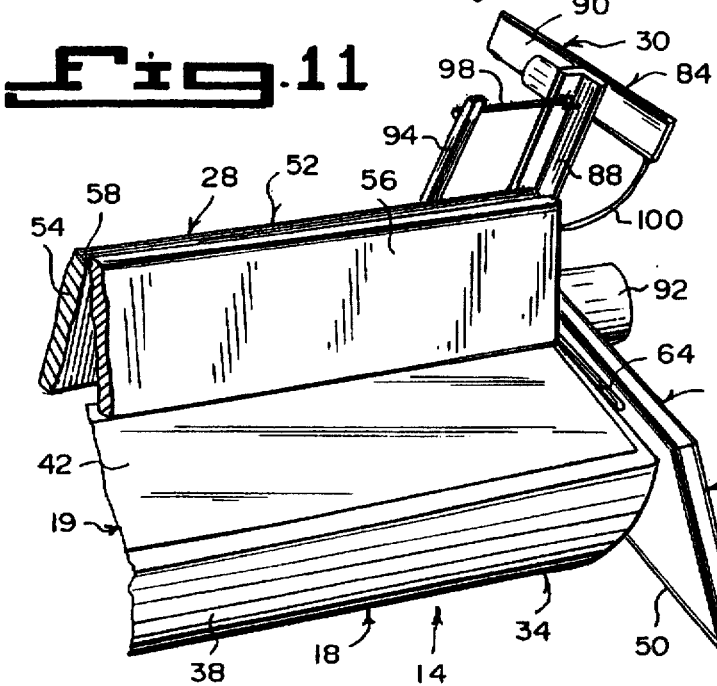
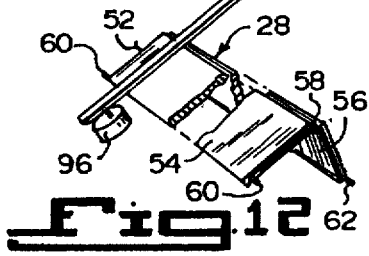
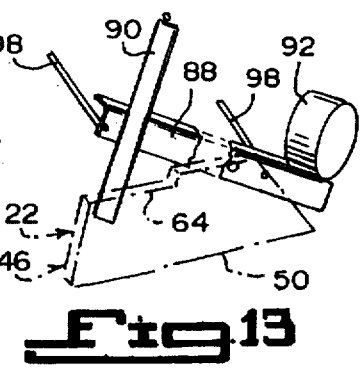

SOLAR ENERGY COLLECTOR

BACKGROUND OF THE INVENTION

1. Field of the Invention

The instant invention relates generally to solar power systems and more specifically it relates to a solar energy collector.

2. Description of the Prior Art

Numerous solar power systems have been provided in prior art that are adapted to convert solar radiation into thermal energy. While these units may be suitable for the particular purpose to which they address, they would not be as suitable for the purposes of the present invention as heretofore described.

SUMMARY OF THE INVENTION

A primary object of the present invention is to provide a solar energy collector that will overcome the shortcomings of the prior art devices.

Another object is to provide a solar energy collector that will retain heat twenty four hours a day, in which a light sensitive mechanism connected to a bi-fold lid will automatically open the bi-fold lid during the daylight hours and close the bi-fold lid during the nighttime hours.

An additional object is to provide a solar energy collector in which the light sensitive mechanism can be an insulated gravity driver system, an expanding inner tube system or an end cap plate driver system.

A further object is to provide a solar energy collector that is simple and easy to use.

A still further object is to provide a solar energy collector that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a front perspective view, showing multiple units of the instant invention on a roof, with the bi-fold lids in an open position.

FIG. 2 is a front perspective view of the instant invention on the roof with the bi-fold lid in a closed position by a gravity driver system.

FIG. 3 is a partly exploded front perspective view of the instant invention per se.

FIG. 4 is a rear perspective view taken in the direction of arrow 4 in FIG. 3 of just the bi-fold lid, showing the gravity driver system in greater detail thereon.

FIG. 5 is an end view taken in the direction of arrow 5 FIG. 2 with parts broken away, showing the bi-fold lid in a closed position.

FIG. 6 is an end view similar to FIG. 5, showing the bi-fold lid in a partly opened position.

FIG. 7 is an end view similar to FIG. 6, showing the bi-fold lid in a fully opened position.

FIG. 8 is an enlarged front perspective view of the area indicated by arrow 8 in FIG. 1.

FIG. 9 is a perspective view showing an expanding inner tube system for the bi-fold lid.

FIG. 10 is a front perspective view with parts broken away showing the bi-fold lid in an open position by an end cap driver system.

FIG. 11 is a front perspective view taken in the direction of arrow 11 in FIG. 10.

FIG. 12 is a rear perspective view with parts broken away of the bi-fold lid, showing the lid arm and counter balance connected thereto.

FIG. 13 is a front perspective view with parts broken away and in phantom, showing the end cap driver system going into a closed position.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 13 illustrate a solar energy collector 14 which comprises a heat absorbing structure 16 which takes in radiant energy and transfers the radiant energy to water carried therein. A main body 18 encompasses the heat absorbing structure 16. The radiant energy will enter a transparent top portion 19 of the main body 18 to reach the heat absorbing structure 16. Elements 20 are for carrying the water into and out of the heat absorbing structure 16.

Components 22 are for supporting opposite ends of the heat absorbing structure 16 within the main body 18 on a roof 24 of a building 26. A facility 28 is for covering the transparent top portion 19 of the main body 18. Equipment 30 is for automatically opening the covering facility 28 during daylight hours to expose the transparent top portion 19, to allow the radiant energy to reach the heat absorbing structure 16 and for automatically closing the covering facility 28 during nighttime hours, to seal the transparent top portion 19 to keep the radiant energy within the heat absorbing structure 16 in the main body 18.

The heat absorbing structure 16 is an elongated black colored cylindrical storage tank 32 to hold the water therein. The main body 18, as best seen in FIG. 3, includes an elongated generally U-shaped housing 34 made of an insulated material 36 coated on the exterior with a thin plastic wall 38 and lined on the interior with a mirrored film 40 that reflects the radiant energy back onto the heat absorbing structure 16 therein. A glazed sheet 42 covers the U-shaped housing 34 above the heat absorbing structure 16. An elongated rib 43 is longitudinally mounted in the bottom of the U-shaped housing 34, so as to support the U-shaped housing 34.

The water carrying elements 20 consist of a pair of pipes 44. Each pipe 44 extends from one end of the heat absorbing structure 16, so that the water can enter and exit therefrom. The supporting components 22 comprises a pair of end cap plates 46. Each end cap plate 46 has an aperture 48 therethrough and a flat base 50. A pipe 44 extending from an end of the heat absorbing structure 16 extends through one aperture 48. The flat base 50 can be placed in a stationary position onto the roof 24 of the building 26 without slipping and sliding on the roof 24.

The covering facility 28 is a bi-fold lid 52 pivotally connected to the supporting components 22 and sized to fit over the transparent top portion 19 of the main body 18, when the bi-fold lid 52 is in a closed position. The bi-fold lid 52 includes an elongated rear cover 54 and an elongated front cover 56. A hinge 58 is between abutting edges of the rear cover 54 and the front cover 56. A pair of pivot pins 60 extend from opposite side edges of the rear cover 54 away from the hinge 58. The pivot pins 60 extend into the support components 22 to pivot thereabout. A pair of slide pins 62 extend from opposite side edges of the front cover 56 away from the hinge 58. The slide pins 62 can extend within guide tracks 64 in the support components 22 to ride therein, when the bi-fold lid 52 goes into an open position.

The automatically opening and closing equipment 30, as used in FIGS. 1 through 8, is an insulated gravity driver system 66 which includes a horizontal counterbalance member 68 extending rearwardly from the covering facility 28. A horizontal uninsulated canister 70 is mounted on the covering facility 28. A horizontal insulated canister 72 for holding a refrigerant liquid therein is mounted on the counterbalance member 68. A capillary tube 74 extends between the uninsulated canister 70 and the insulated canister 72. When sunlight shines on the uninsulated canister 70, the refrigerant liquid will expand to go through the capillary tube 74 into the insulated canister 72, causing the covering facility 28 to go into the open position. When darkness comes the refrigerant liquid will condense to go back through the capillary tube 74 to the uninsulated canister 70, causing the covering facility 28 to go into the closed position.

The automatically opening and closing equipment 30, as used in FIG. 9, is an expanding inner tube system 76 which consists of a cylindrical container 78 made out of a flexible material that resists hydrocarbon chemical degrading and permeability, that is placed in a rear hinged part of the covering facility 28 at the transparent top portion 19 of the main body 18. A small copper solar plate 80 is filled with refrigerant liquid. A capillary tube 82 extends between the cylindrical container 78 and the small copper solar plate 80. When the solar plate 80 is exposed to heat and light, the refrigerant liquid will expand to go through the capillary tube 82 to the cylindrical container 78, causing the cylindrical container 78 to expand and the covering facility 28 to go into the open position. When the solar plate 80 is exposed to darkness, the refrigerant liquid will condense to go back through the capillary tube 82 to the solar plate 80, causing the cylindrical container 78 to contract and the covering facility 28 to go into the closed position.

The automatically opening and closing equipment 30, as used in FIGS. 10 through 13, is an end cap plate driver system 84 which comprises a ball bearing wheel 86 mounted on one end cap plate 46 of the supporting component 22. A pivot arm 88 is connected to the ball bearing wheel 86. An uninsulated canister/solar panel 90 is mounted to a top end of the pivot arm 88. An insulated canister 92 for holding a refrigerant liquid therein is mounted to a bottom end of the pivot arm 88. A lid arm 94 is affixed transversely to a rear portion of the covering facility 28. A counterbalance member 96 is attached to a lower end of the lid arm 94.

A pair of transfer rods 98 are spaced apart and affixed at one end to the pivot arm 88, so that the transfer rods 98 will engage with the lid arm 94. A capillary tube 100 extends between the uninsulated canister/solar panel 90 and the insulated canister 92. When sunlight shines on the uninsulated canister/solar panel 90, the refrigerant liquid will expand to go through the capillary tube 100 to said insulated canister 92, causing the pivot arm 88 to swing up with the transfer rods 98 moving away from the lid arm 94 and the counterbalance member 96 pulling the lid arm 94 up with the covering facility 28 going into the open position. When darkness comes the refrigerant liquid will condense to go back through the capillary tube 100 to the uninsulated canister/solar panel 90, causing the pivot arm 88 to swing down with the transfer rods 98 pushing the lid arm 94 down with the covering facility 28 going into the closed position.

LIST OF REFERENCE NUMBERS 14 solar energy collector
16 heat absorbing structure of 14
18 main body of 14
19 transparent top portion of 18
20 water carrying elements of 14
22 supporting component of 14
24 roof of 26
26 building
28 covering facility of 14
30 automatically opening and closing equipment of 14
32 elongated black colored cylindrical storage tank for 16
34 elongated generally U-shaped housing for 18
36 insulated material of 34
38 thin exterior plastic wall on 36
40 lined interior mirrored film on 36
42 glazed sheet of 18 at 19
43 elongated rib in 34
44 pipe of 20
46 end cap plate for 22
48 aperture in 46 for 44
50 flat base of 46
52 bi-fold lid for 28
54 elongated rear cover of 52
56 elongated front cover of 52
58 hinge between 54 and 56
60 pivot pin on 54
62 slide pin on 56
64 guide track in 22
66 insulated gravity driver system for 30
68 horizontal counterbalance member of 66
70 horizontal uninsulated canister of 66 on 28
72 horizontal insulated canister of 66 on 68
74 capillary tube of 66 between 70 and 72
76 expanding inner tube system for 30
78 cylindrical container of 76
80 small copper solar plate of 76
82 capillary tube of 76 between 78 and 80
84 end cap plate driver system for 30
86 ball bearing wheel of 84 on 22
88 pivot arm of 84 on 86
90 uninsulated canister/solar panel of 84 on top end of 88
92 insulated canister of 84 on bottom end of 88
94 lid arm of 84 on 28
96 counterbalance member of 84 on lower end of 94

98 transfer rod of 84 on 88

100 capillary tube of 84 between 90 and 92

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A solar energy collector which comprises:
   a) a heat absorbing structure which takes in radiant energy and transfers the radiant energy to water carried therein;
   b) a main body to encompass said heat absorbing structure, whereby the radiant energy will enter a transparent top portion of said main body to reach said heat absorbing structure;
   c) means for carrying the water into and out of said heat absorbing structure;
   d) means for supporting opposite ends of said heat absorbing structure within said main body on a roof of a building;
   e) means for covering said transparent top portion of said main body, said covering means being a bi-fold lid pivotally connected to said supporting means and sized to fit over said transparent top portion of said main body, when said bi-fold lid is in a closed position, said bi-fold lid including:
      i) an elongated rear cover:
      ii) an elongated front cover;
      iii) a hinge between abutting edges of said rear cover and said front cover;
      iv) a pair of pivot pins extending from opposite side edges of said rear cover away from said hinge, so that said pivot pins can extend into said support means to pivot thereabout; and
      v) a pair of slide pins extending from opposite side edges of said front cover away from said hinge, so that said slide pins can extend within guide tracks in said support means to ride therein when said bi-fold lid goes into an open position; and
   f) means for automatically opening said covering means during daylight hours to expose said transparent top portion, to allow the radiant energy to reach said heat absorbing structure and for automatically closing said covering means during nighttime hours, to seal said transparent top portion to keep the radiant energy within said heat absorbing structure in said main body.

2. A solar energy collector as recited in claim 1, wherein said heat absorbing structure is an elongated black colored cylindrical storage tank to hold the water therein.

3. A solar energy collector as recited in claim 2, wherein said main body includes:

a) an elongated generally U-shaped housing made of an insulated material coated on the exterior with a thin plastic wall and lined on the interior with a mirrored film that reflects the radiant energy back onto said heat absorbing structure therein;
   b) a glazed sheet to cover said U-shaped housing above said heat absorbing structure; and
   c) an elongated rib longitudinally mounted in the bottom of said U-shaped housing, so as to support said U-shaped housing.

4. A solar energy collector as recited in claim 3, wherein said water carrying means includes a pair of pipes, in which each said pipe extends from one end of said heat absorbing structure, so that the water can enter and exit therefrom.

5. A solar energy collector as recited in claim 4, wherein said supporting means includes a pair of end cap plates, in which each said end cap plate has an aperture therethrough and a flat base, so that a pipe extending from an end of said heat absorbing structure can extend through one said aperture, while said flat base can be placed in a stationary position onto the roof of the building without slipping and sliding on the roof.

6. A solar energy collector as recited in claim 4, wherein said automatically opening and closing means is an insulated gravity driver system which includes:
   a) a horizontal counterbalance member extending rearwardly from said covering means;
   b) a horizontal uninsulated canister mounted on said covering means;
   c) a horizontal insulated canister for holding a refrigerant liquid therein mounted on said counterbalance member; and
   d) a capillary tube extending between said uninsulated canister and said insulated canister, so that when sunlight shines on said uninsulated canister, the refrigerant liquid will expand to go through said capillary tube into said insulated canister causing said covering means to go into the open position, and when darkness comes the refrigerant liquid will condense to go back through said capillary tube to said uninsulated canister causing said covering means to go into the closed position.

7. A solar energy collector as recited in claim 4, wherein said automatically opening and closing means is an expanding inner tube system which includes:
   a) a cylindrical container made out of a flexible material that resists hydrocarbon chemical degrading and permeability, placed in a rear hinged part of said covering means at said transparent top portion of said main body;
   b) a small copper solar plate filled with refrigerant liquid; and
   c) a capillary tube extending between said cylindrical container and said small copper solar plate, so that when said solar plate is exposed to heat and light, the refrigerant liquid will expand to go through said capillary tube to said cylindrical container, causing said cylindrical container to expand and said covering means to go into the open position and when said solar plate is exposed to darkness, the refrigerant liquid will condense to go back through said capillary tube to said solar plate, causing said cylindrical container to contract and said covering means to go into the closed position.

8. A solar energy collector as recited in claim 4, wherein said automatically opening and closing means is an end cap plate driver system which includes:

a) a ball bearing wheel mounted on one end cap plate of said supporting means;

b) a pivot arm connected to said ball bearing wheel;

c) an uninsulated canister/solar panel mounted to a top end of said pivot arm;

d) an insulated canister for holding a refrigerant liquid therein mounted to a bottom end of said pivot arm;

e) a lid arm affixed transversely to a rear portion of said covering means;

f) a counterbalance member attached to a lower end of said lid arm;

g) a pair of transfer rods spaced apart and affixed at one end to said pivot arm, so that said transfer rods will engage with said lid arm; and h) a capillary tube extending between said uninsulated canister/solar panel and said insulated canister, so that when sunlight shines on said uninsulated canister/solar panel the refrigerant liquid will expand to go through said capillary tube to said insulated canister, causing said pivot arm to swing up with said transfer rods moving away from said lid arm and said counterbalance member pulling said lid arm up with said covering means going into the open position, and when darkness comes the refrigerant liquid will condense to go back through said capillary tube to said uninsulated canister/solar panel, causing said pivot arm to swing down with said transfer rods pushing said lid arm down with said covering means going into the closed position.

9. A solar energy collector as recited in claim 1, wherein said main body includes:

a) an elongated generally U-shaped housing made of an insulated material coated on the exterior with a thin plastic wall and lined on the interior with a mirrored film that reflects the radiant energy back onto said heat absorbing structure therein;

b) a glazed sheet to cover said U-shaped housing above said heat absorbing structure; and c) an elongated rib longitudinally mounted in the bottom of said U-shaped housing, so as to support said U-shaped housing.

10. A solar energy collector as recited in claim 1, wherein said water carrying means includes a pair of pipes, in which each said pipe extends from one end of said heat absorbing structure, so that the water can enter and exit therefrom.

11. A solar energy collector as recited in claim 1, wherein said supporting means includes a pair of end cap plates, in which each said end cap plate has an aperture therethrough and a flat base, so that a pipe extending from an end of said heat absorbing structure can extend through one said aperture, while said flat base can be placed in a stationary position onto the roof of the building without slipping and sliding on the roof.

12. A solar energy collector as recited in claim 1, wherein said automatically opening and closing means is an insulated gravity driver system which includes:

a) a horizontal counterbalance member extending rearwardly from said covering means;

b) a horizontal uninsulated canister mounted on said covering means;

c) a horizontal insulated canister for holding a refrigerant liquid therein mounted on said counterbalance member; and d) a capillary tube extending between said uninsulated canister and said insulated canister, so that when sunlight shines on said uninsulated canister, the refrigerant liquid will expand to go through said capillary tube into said insulated canister causing said covering means to go into the open position, and when darkness comes the refrigerant liquid will condense to go back through said capillary tube to said uninsulated canister causing said covering means to go into the closed position.

13. A solar energy collector as recited in claim 1, wherein said automatically opening and closing means is an expanding inner tube system which includes:

a) a cylindrical container made out of a flexible material that resists hydrocarbon chemical degrading and permeability, placed in a rear hinged part of said covering means at said transparent top portion of said main body;

b) a small copper solar plate filled with refrigerant liquid; and c) a capillary tube extending between said cylindrical container and said small copper solar plate, so that when said solar plate is exposed to heat and light, the refrigerant liquid will expand to go through said capillary tube to said cylindrical container, causing said cylindrical container to expand and said covering means to go into the open position and when said solar plate is exposed to darkness, the refrigerant liquid will condense to go back through said capillary tube to said solar plate, causing said cylindrical container to contract and said covering means to go into the closed position.

14. A solar energy collector as recited in claim 1, wherein said automatically opening and closing means is an end cap plate driver system which includes:

a) a ball bearing wheel mounted on one end cap plate of said supporting means;

b) a pivot arm connected to said ball bearing wheel;

c) an uninsulated canister/solar panel mounted to a top end of said pivot arm;

d) an insulated canister for holding a refrigerant liquid therein mounted to a bottom end of said pivot arm;

e) a lid arm affixed transversely to a rear portion of said covering means;

f) a counterbalance member attached to a lower end of said lid arm;

g) a pair of transfer rods spaced apart and affixed at one end to said pivot arm, so that said transfer rods will engage with said lid arm; and h) a capillary tube extending between said uninsulated canister/solar panel and said insulated canister, so that when sunlight shines on said uninsulated canister/solar panel the refrigerant liquid will expand to go through said capillary tube to said insulated canister, causing said pivot arm to swing up with said transfer rods moving away from said lid arm and said counterbalance member pulling said lid arm up with said covering means going into the open position, and when darkness comes the refrigerant liquid will condense to go back through said capillary tube to said uninsulated canister/solar panel, causing said pivot arm to swing down with said transfer rods pushing said lid arm down with said covering means going into the closed position.

15. A solar energy collector comprising:

a) a heat absorbing structure which takes in radiant energy and transfers the radiant energy to water carried therein;

b) a main body to encompass said heat absorbing structure, whereby the radiant energy will enter a transparent top portion of said main body to reach said heat absorbing structure;

c) means for carrying the water into and out of said heat absorbing structure;

d) means for supporting opposite ends of said heat absorbing structure within said main body on a roof of a building;

e) means for covering said transparent top portion of said main body; and f) an insulated gravity driver system for automatically opening and closing said covering, said gravity driver system including:

i) a horizontal counterbalance member extending rearwardly from said covering means;

ii) a horizontal uninsulated canister mounted on said covering means;

iii) a horizontal insulated canister for holding a refrigerant liquid therein mounted on said counterbalance member; and iv) a capillary tube extending between said uninsulated canister and said insulated canister, so that when sunlight shines on said uninsulated canister, the refrigerant liquid will expand to go through said capillary tube into said insulated canister causing said covering means to go into the open position, and when darkness comes the refrigerant liquid will condense to go back through said capillary tube to said uninsulated canister causing said covering means to go into the closed position.

16. A solar energy collector comprising:

a) a heat absorbing structure which takes in radiant energy and transfers the radiant energy to water carried therein;

b) a main body to encompass said heat absorbing structure, whereby the radiant energy will enter a transparent top portion of said main body to reach said heat absorbing structure;

c) means for carrying the water into and out of said heat absorbing structure;

d) means for supporting opposite ends of said heat absorbing structure within said main body on a roof of a building;

e) means for covering said transparent top portion of said main body; and f) an expanding inner tube system for automatically opening and closing said covering, said inner tube system including:

i) a cylindrical container made out of a flexible material that resists hydrocarbon chemical degrading and permeability, placed in a rear hinged part of said covering means at said transparent top portion of said main body;

ii) a small copper solar plate filled with refrigerant liquid; and iii) a capillary tube extending between said cylindrical container and said small copper solar plate, so that when said solar plate is exposed to heat and light, the refrigerant liquid will expand to go through said capillary tube to said cylindrical container, causing said cylindrical container to expand and said covering means to open, and when said solar plate is exposed to darkness, the refrigerant liquid will condense to go back through said capillary tube to said solar plate, causing said cylindrical container to contract and said covering means to go into the closed position.

17. A solar energy collector comprising:

a) a heat absorbing structure which takes in radiant energy and transfers the radiant energy to water carried therein;

b) a main body to encompass said heat absorbing structure, whereby the radiant energy will enter a transparent top portion of said main body to reach said heat absorbing structure;

c) means for carrying the water into and out of said heat absorbing structure;

d) means for supporting opposite ends of said heat absorbing structure within said main body on a roof of a building, said supporting means including a pair of end cap plates, in which each said end cap plate has an aperture therethrough and a flat base, so that a pipe extending from an end of said heat absorbing structure can extend through one said aperture, while said flat base can be placed in a stationary position onto the roof of the building;

e) means for covering said transparent top portion of said main body; and f) an end cap plate driver system for automatically opening and closing said covering, said end cap plate driver system including:

i) a ball bearing wheel mounted on one end cap plate of said supporting means;

ii) a pivot arm connected to said ball bearing wheel;

iii) an uninsulated canister/solar panel mounted to a top end of said pivot arm;

iv) an insulated canister for holding a refrigerant liquid therein mounted to a bottom end of said pivot arm;

v) a lid arm affixed transversely to a rear portion of said covering means;

vi) a counterbalance member attached to a lower end of said lid arm;

vii) a pair of transfer rods spaced apart and affixed at one end to said pivot arm, so that said transfer rods will engage with said lid arm; and viii) a capillary tube extending between said uninsulated canister/solar panel and said insulated canister, so that when sunlight shines on said uninsulated canister/solar panel, the refrigerant liquid will expand to go through said capillary tube to said insulated canister, causing said pivot arm to swing up with said transfer rods moving away from said lid arm and said counterbalance member pulling said lid arm up with said covering means going into the open position, and when darkness comes the refrigerant liquid will condense to go back through said capillary tube to said uninsulated canister/solar panel, causing said pivot arm to swing down with said transfer rods pushing said lid arm down with said covering means gong into the closed position.

* * * * *